US010021325B2

(12) United States Patent
Miyamoto (10) Patent No.: US 10,021,325 B2
(45) Date of Patent: Jul. 10, 2018

(54) IMAGE SENSOR AND IMAGE CAPTURING APPARATUS (71) Applicant: CANON KABUSHIKI KAISHA, Tokyo (JP)

(72) Inventor: Yoshiaki Miyamoto, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/355,460

(22) Filed: Nov. 18, 2016

(65) Prior Publication Data

US 2017/0150094 A1 May 25, 2017

(30) Foreign Application Priority Data

Nov. 25, 2015 (JP) ................................. 2015-230025

(51) Int. Cl.
| H04N 5/369 | (2011.01) |
| H04N 5/335 | (2011.01) |
| H04N 5/917 | (2006.01) |
| H04N 5/77 | (2006.01) |
| H04N 5/378 | (2011.01) |

(52) U.S. Cl.
CPC ............. H04N 5/369 (2013.01); H04N 5/335 (2013.01); H04N 5/772 (2013.01); H04N 5/917 (2013.01); *H04N 5/378* (2013.01)

(58) Field of Classification Search
CPC ........ H04N 5/369; H04N 5/335; H04N 5/917; H04N 5/772; H04N 5/378
See application file for complete search history.

(56) References Cited

U.S. PATENT DOCUMENTS

| 4,780,897 A | 10/1988 | McDaniel et al. |
| 8,009,213 B2 | 8/2011 | Okita et al. |
| 8,158,920 B2 | 4/2012 | Suzuki et al. |
| 8,159,573 B2 | 4/2012 | Suzuki et al. |
| 8,278,613 B2 | 10/2012 | Okita et al. |
| 8,427,567 B2 | 4/2013 | Okita et al. |
| 8,508,639 B2 | 8/2013 | Mabuchi et al. |
| 8,648,951 B2 | 2/2014 | Mabuchi et al. |
| 8,988,575 B2 | 3/2015 | Mabuchi et al. |

(Continued)

FOREIGN PATENT DOCUMENTS

| EP | 2234387 A1 | 9/2010 |
| EP | 2549763 A2 | 1/2013 |

(Continued)

OTHER PUBLICATIONS

Search Report dated Apr. 18, 2017, in European Patent Application No. 16197490.2.

(Continued)

*Primary Examiner* — Shahbaz Nazrul
(74) *Attorney, Agent, or Firm* — Fitzpatrick, Cella, Harper & Scinto (57) ABSTRACT

An image sensor provided with an imaging unit including a plurality of photoelectric converters, the image sensor comprises: an input unit to which compressed image data is input from the outside of the image sensor; a decompressor for decompressing the compressed image data input from the input unit; and an image processor that applies image processing to image pickup data obtained from the imaging unit and to the image data decompressed by the decompressor.

8 Claims, 9 Drawing Sheets

(56) References Cited

U.S. PATENT DOCUMENTS

| | | | |
|---|---|---|---|
| 2007/0177025 A1 | 8/2007 | Kopet et al. | |
| 2008/0012952 A1 | 1/2008 | Lee | |
| 2009/0174811 A1* | 7/2009 | Sung | H04N 1/6058 348/396.1 |
| 2010/0053212 A1* | 3/2010 | Kang | H04N 21/23412 345/629 |
| 2012/0147209 A1* | 6/2012 | Hiraoka | H04N 5/37455 348/222.1 |
| 2012/0274808 A1* | 11/2012 | Chong | H04N 5/23293 348/234 |
| 2013/0308870 A1* | 11/2013 | Shan | H04N 19/176 382/233 |
| 2014/0015996 A1* | 1/2014 | Chawla | H04N 5/225 348/222.1 |
| 2014/0152871 A1* | 6/2014 | Campbell | H04N 19/423 348/231.99 |
| 2015/0155325 A1 | 6/2015 | Mabuchi et al. | |
| 2015/0281539 A1* | 10/2015 | Ueki | H04N 5/232 348/298 |
| 2015/0312476 A1* | 10/2015 | Wakabayashi | H04N 1/41 348/231.99 |
| 2015/0319390 A1 | 11/2015 | Sanchez et al. | |
| 2015/0362372 A1 | 12/2015 | Venkatesha et al. | |
| 2016/0150128 A1 | 5/2016 | Shaffer et al. | |
| 2016/0293646 A1 | 10/2016 | Miyamoto et al. | |
| 2016/0323518 A1 | 11/2016 | Rivard et al. | |

FOREIGN PATENT DOCUMENTS

| | | |
|---|---|---|
| JP | 2006-049361 A | 2/2006 |
| JP | 2015-041971 A | 3/2015 |

OTHER PUBLICATIONS

Yoshiaki Miyamoto, U.S. Appl. No. 15/353,103, filed Nov. 16, 2016.

* cited by examiner

IMAGE SENSOR AND IMAGE CAPTURING APPARATUS

BACKGROUND OF THE INVENTION

Field of the Invention

The present invention relates to an image sensor and an image capturing apparatus, and especially to a configuration of an image sensor.

Description of the Related Art

Conventionally, CMOS image sensors and similar image sensors are widely used in image capturing apparatuses, such as digital still cameras and digital video cameras.

In recent years, image sensors in which an image sensor substrate and a signal processor substrate are stacked together have been suggested; the image sensor substrate is composed of a plurality of pixels including photoelectric converters that convert light into electricity, and the signal processor substrate applies signal processing to image pickup signals output from the image sensor substrate. Japanese Patent Laid-Open No. 2015-41971 suggests, as one example of such image sensors, an image sensor having a signal processor substrate that converts analog signals output from an image sensor substrate into digital signals, and then compresses the digital signals. Image sensors with a stacked structure can include a smaller and more functional signal processor substrate.

There is a great need for application of processing to an image (a RAW image) that has been output from an image capturing apparatus and stored to a recording medium, e.g., additional image processing (defective pixel correction, noise reduction, etc.) and redevelopment with a different white balance.

However, in order to apply image processing and redeveloping processing to an image (a RAW image) that has been output from an image sensor, an image processing chip needs to be provided outside the image sensor.

Furthermore, as described in Japanese Patent Laid-Open No. 2015-41971, in applying image processing and developing processing to compressed image data that has been output to the outside of an image sensor, the compressed image data needs to be restored to uncompressed image data through decompression processing.

SUMMARY OF THE INVENTION

The present invention has been made in consideration of the above situation, and enables high-speed input of image data from the outside of the image sensor and execution of image processing on the input image data inside an image sensor.

According to the present invention, provided is an image sensor provided with an imaging unit including a plurality of photoelectric converters, the image sensor comprising: an input unit to which compressed image data is input from the outside of the image sensor; a decompressor for decompressing the compressed image data input from the input unit; and an image processor that applies image processing to image pickup data obtained from the imaging unit and to the image data decompressed by the decompressor.

Further, according to the present invention, provided is an image capturing apparatus, comprising: an image sensor including an imaging unit having a plurality of photoelectric converters, an input unit to which compressed image data is input from the outside of the image sensor, a decompressor for decompressing the compressed image data input from the input unit, and an image processor that applies image processing to image pickup data obtained from the imaging unit and to the image data decompressed by the decompressor; and a second image sensor including a plurality of second photoelectric converters, a second compressor that compresses image data obtained from the plurality of second photoelectric converters, and a second output unit for outputting the image data compressed by the second compressor, wherein the image processor applies the image processing to an image pickup signal obtained from the imaging unit and to the image data that has been input from the second output unit to the input unit and decompressed by the decompressor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
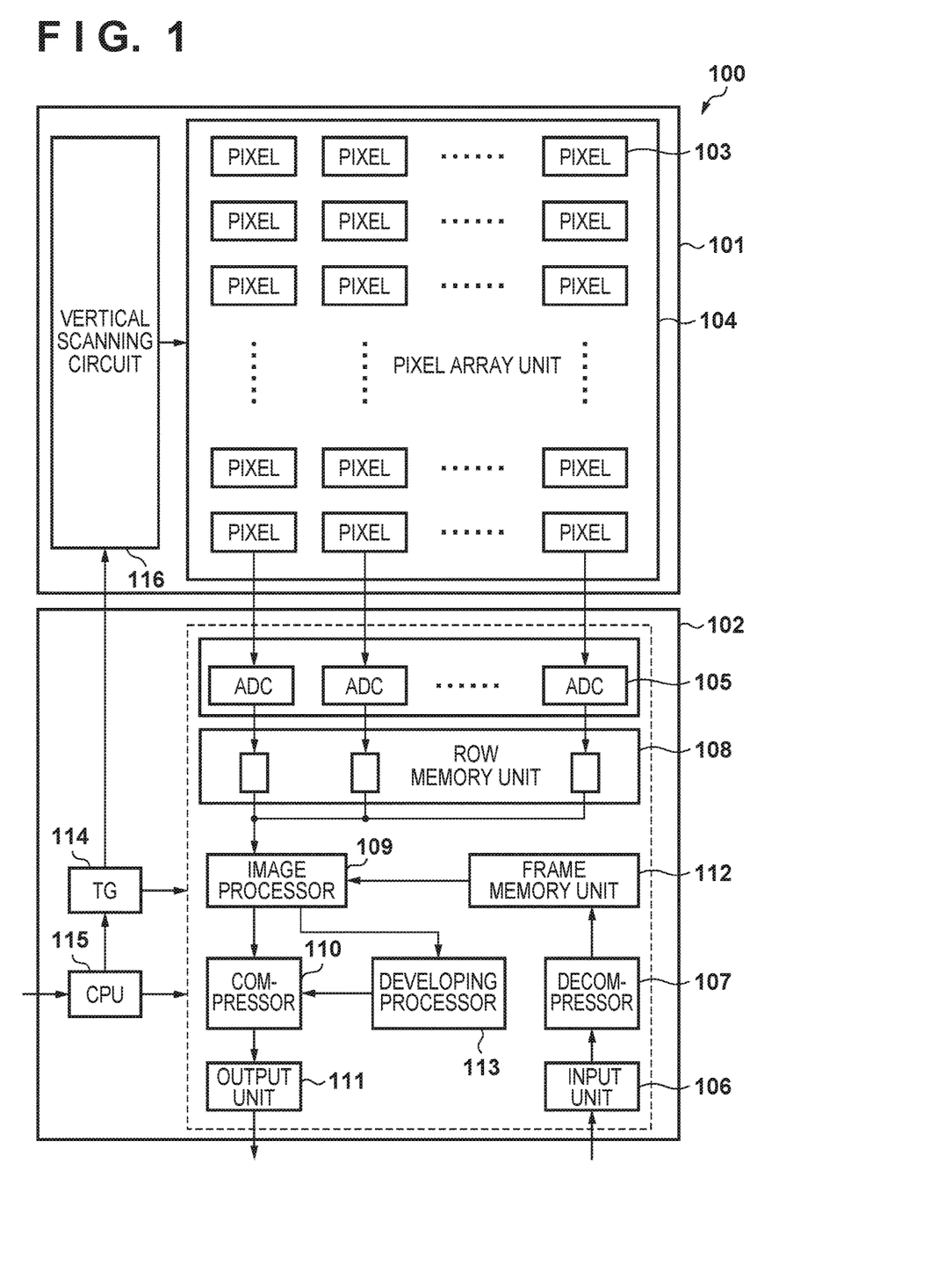
FIG. 1 is a block diagram showing an exemplary configuration of an image sensor according to a first embodiment of the present invention.

FIG. 1 is a block diagram showing an exemplary configuration of an image sensor 100 according to a first embodiment of the present invention. The image sensor 100 is structured in such a manner that an image sensor substrate 101 (an imaging unit) and a signal processor substrate 102 (a processing unit) are stacked together (a stacked structure). Although not shown in FIG. 1, the image sensor substrate 101 and the signal processor substrate 102 are connected by microbumps and vias, and electrical connection is established therebetween.

The image sensor substrate 101 includes a pixel array unit 104 in which a plurality of pixels 103 including photoelectric converters that convert light into electricity are arrayed two-dimensionally in row and column directions, and a vertical scanning circuit 116. The signal processor substrate 102 includes analog/digital converters (ADCs) 105, a row memory unit 108, an image processor 109, a compressor 110, an output unit 111, a developing processor 113, a timing generator (TG) 114, and a CPU 115. The signal processor substrate 102 also includes an input unit 106, a decompressor 107, and a frame memory unit 112.

The pixels 103 generate and accumulate signal charges corresponding to light with which they have been illuminated. The pixels 103 then supply the signal charges as image pickup signals to the ADCs 105 included in the signal processor substrate 102.

The ADCs 105 are disposed in one-to-one correspondence with pixel columns of the pixel array unit 104, and convert image pickup signals that are sequentially output from the pixel array unit 104 on a per-row basis into image pickup data by applying analog/digital conversion processing to the image pickup signals on a per-row basis. The ADCs 105 supply the image pickup data obtained through the conversion to the row memory unit 108, and the row memory unit 108 stores the per-row image pickup data supplied from the ADCs 105. The row memory unit 108 supplies the stored data to the image processor 109.

The image processor 109 applies various types of image processing to the image pickup data supplied from the row memory unit 108. Examples of the image processing applied here include shading correction and defect correction. Hereinafter, in the present embodiment, data obtained by applying the image processing to image pickup data generated through the analog/digital conversion processing will be referred to as a RAW image. The image processor 109 supplies the RAW image obtained through the image processing to the developing processor 113 and the compressor 110.

The developing processor 113 applies various types of developing processing to the RAW image supplied from the image processor 109. Examples of the developing processing applied here include white balance adjustment, brightness correction, demosaicing, and filter processing. Hereinafter, in the present embodiment, image data to which the developing processing has been applied is referred to as a development image. The developing processor 113 supplies the development image obtained through the developing processing to the compressor 110.

The compressor 110 has a function of reducing a data amount by executing compression processing using well-known techniques, such as differential pulse-code modulation (DPCM), discrete cosine transform (DCT), and Huffman encoding. The compressor 110 can also implement two compression methods, specifically, lossless compression and lossy compression, using these processing circuits. The compressor 110 applies compression processing to the RAW image and the development image supplied from the image processor 109 and the developing processor 113.

In compressing the RAW image supplied from the image processor 109, the compressor 110 generates a compressed RAW image by applying lossless compression to the RAW image. In compressing the development image supplied from the developing processor 113, the compressor 110 generates a JPEG image by implementing a lossy compression method, typically a JPEG encoding method. It goes without saying that the compressor 110 can also apply lossy compression to the RAW image supplied from the image processor 109. Furthermore, the compressor 110 appends metadata to the generated compressed RAW image and JPEG image. The compressor 110 then supplies the compressed RAW image and the JPEG image to the output unit 111.

Note that metadata used in the embodiments of the present invention is basically related to a RAW image. Examples of the metadata related to the RAW image include the width and height of the RAW image, information related to an image shooting condition, and information of a lens used in image shooting. Note that the compressed RAW image and the JPEG image output from the compressor 110 have a data structure specified by the Exif standard. Exif, short for exchangeable image file format, is the format of image metadata for digital cameras designed by the Japan Electronic Industry Development Association (JEIDA).

The input unit 106 includes a terminal via which a compressed RAW image is input to the image sensor 100 from the outside of the image sensor 100, and inputs the image to the signal processor substrate 102 using this terminal. The input unit 106 then supplies the input compressed RAW image to the decompressor 107.

The decompressor 107 has a function of executing decompression processing corresponding to an image to which compression processing has been applied using well-known techniques, such as DPCM, DCT, and Huffman encoding. Therefore, the decompressor 107 can execute decompression processing corresponding to two compression methods, specifically, lossless compression and lossy compression. The decompressor 107 executes processing for extracting metadata by analyzing a data structure of the compressed RAW image, and processing for generating a RAW image by decompressing the compressed RAW image. The decompressor 107 supplies the generated RAW image and the extracted metadata to the frame memory unit 112 via parallel communication.

The frame memory unit 112 stores the RAW image and the metadata supplied from the decompressor 107. The frame memory unit 112 also supplies the stored RAW image and metadata to the image processor 109.

The output unit 111 includes a terminal via which the compressed RAW image and the JPEG image supplied from the compressor 110 are output to the outside of the image sensor 100. The output unit 111 outputs these images to the outside using this terminal.

The TG 114 supplies, to the foregoing circuits and processors, a control signal that has been generated to perform predetermined driving for image capture. The CPU 115 controls the entirety of the image sensor 100 on the basis of various types of information that have been set outside the image sensor 100. The vertical scanning circuit 116 controls accumulation and readout of signal charges of the pixels 103 on the basis of the control signal supplied from the TG 114 controlled by the image sensor 100.

In the present embodiment, an image input to the image sensor 100 is a compressed RAW image with metadata appended thereto; alternatively, the input image may have a data structure that enables recording of metadata, such as Exif-TIFF.

Figure 2:
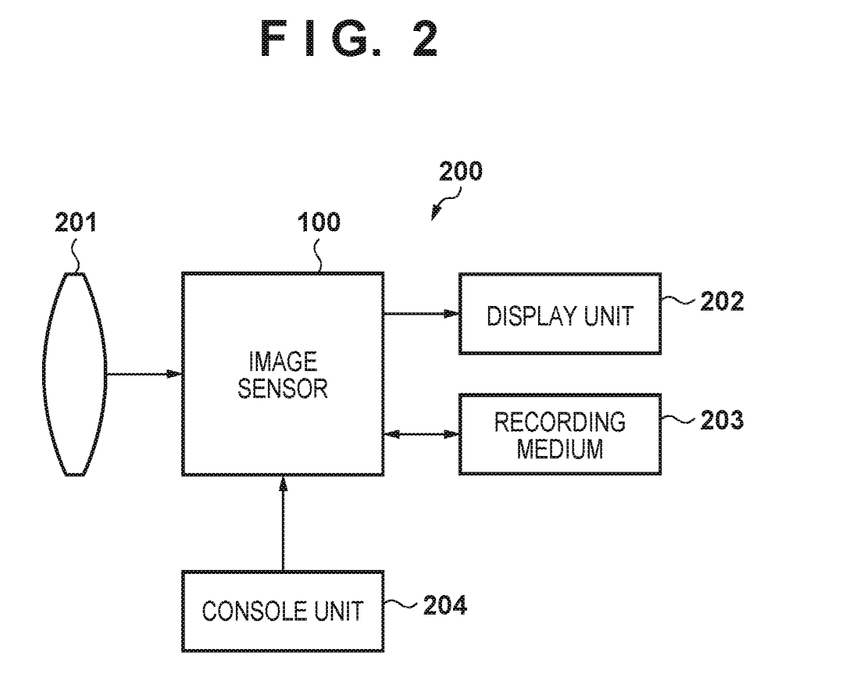
FIG. 2 is a block diagram showing an exemplary configuration of an image capturing apparatus according to the first embodiment.

FIG. 2 is a block diagram showing an exemplary schematic configuration of an image capturing apparatus according to the first embodiment that incorporates the image sensor configured in the above-described manner. An image capturing apparatus 200 includes a lens 201, the image sensor 100, a display unit 202, a recording medium 203, and a console unit 204.

Although illustrated as one lens in FIG. 2, the lens 201 is normally composed of a plurality of lenses, a diaphragm, and the like, and forms an optical image of a subject on the image sensor 100. The image sensor 100 generates image pickup signals by photoelectrically converting the formed optical image, converts the obtained image pickup signals into a compressed RAW image and a JPEG image as described above, and outputs the compressed RAW image and the JPEG image.

The display unit 202 uses, for example, an LCD as a display element, and displays various settings to be configured by a user, the compressed RAW image and the JPEG image output from the image sensor 100, and thumbnail images attached to the compressed RAW image and the JPEG image. The display unit 202 also includes a display circuit for converting the compressed RAW image, the JPEG image, and the thumbnail images into a displayable format.

The recording medium 203 is, for example, a flash memory or a hard disk, and records the compressed RAW image and the JPEG image output from the image sensor 100. The console unit 204 issues operational instructions related to various functions of the image capturing apparatus 200 on the basis of operations performed by the user.

Figure 3:
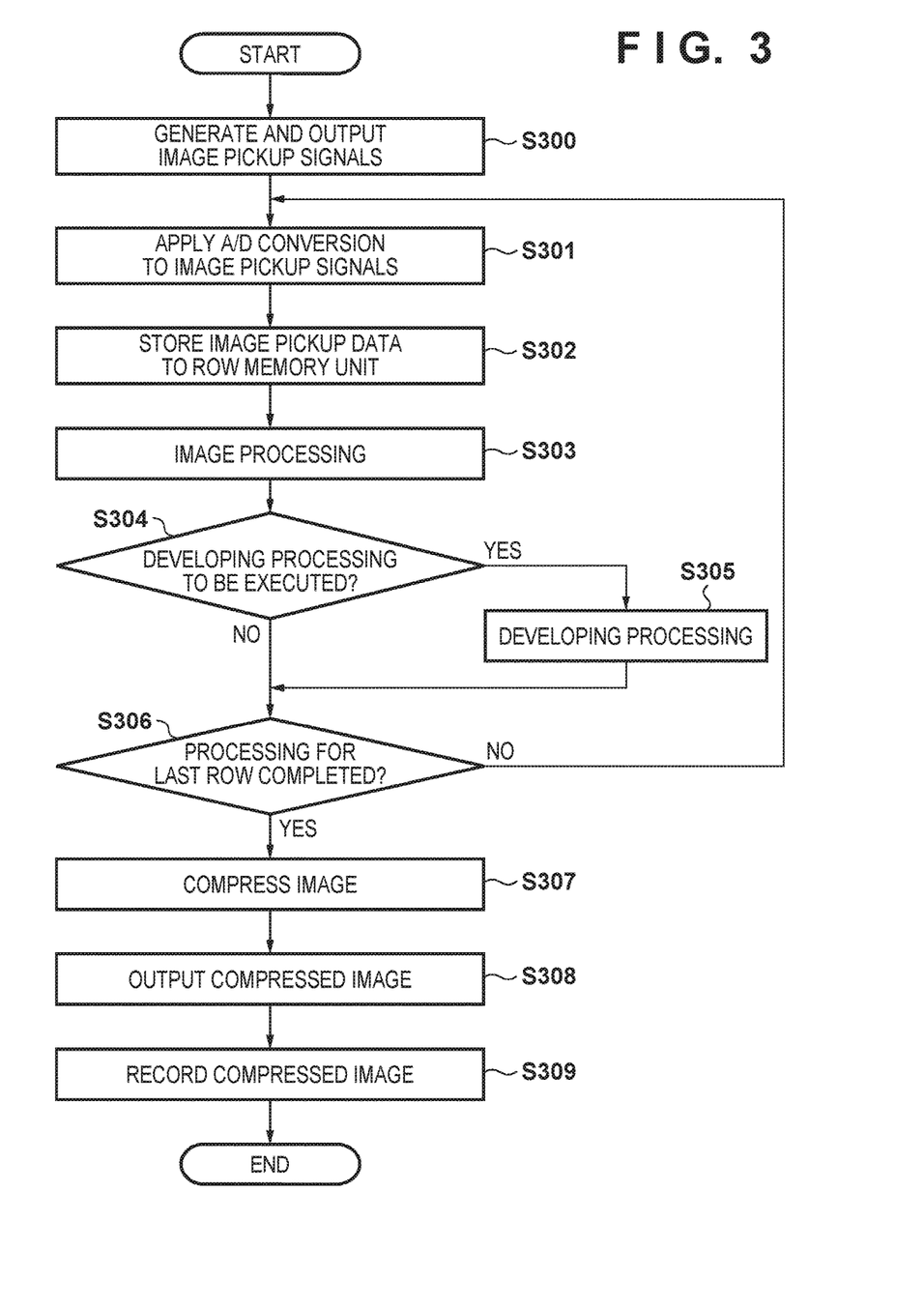
FIG. 3 is a flowchart for describing the flow of image capturing processing according to the first embodiment.

With reference to FIG. 3, the following describes image capturing processing according to the first embodiment that is executed by the image capturing apparatus 200 configured in the above-described manner. First, in step S300, the pixels 103 of the image sensor 100 generate image pickup signals by photoelectrically converting light with which they have been illuminated, and the image pickup signals are sequentially output from the pixel array unit 104 on a per-row basis. Next, in step S301, the ADCs 105 convert the image pickup signals, which have been sequentially output on a per-row basis, into digital data on a per-row basis, and supply image pickup data obtained through the conversion to the row memory unit 108.

In step S302, the row memory unit 108 stores the supplied image pickup data. In step S303, the image processor 109 applies image processing to the image pickup data stored in the row memory unit 108, and supplies a RAW image (image signals) obtained through the image processing to the compressor 110.

In the next step S304, whether to execute developing processing is determined, and if it is determined that the developing processing is not to be executed, step S306 follows. On the other hand, if it is determined that the developing processing is to be executed, the developing processor 113 applies the developing processing to the RAW image obtained through the image processing and supplies a development image obtained through the developing processing to the compressor 110 in step S305, and then step S306 follows.

In step S306, the CPU 115 checks whether processing for image signals output from the last row of the pixel array unit 104 has been completed. If the processing for the image signals output from the last row of the pixel array unit 104 has not been completed, step S301 follows, and the foregoing processing is repeated for the next row.

On the other hand, if the processing for the image signals output from the last row has been completed, step S307 follows in which the compressor 110 generates a compressed RAW image (compressed image signals) by applying lossless compression to the RAW image supplied in step S303, and appends metadata thereto. When the developing processing has been executed, the compressor 110 also generates a JPEG image by compressing the development image supplied in step S305 using a JPEG encoding method, and appends metadata thereto.

In step S308, the output unit 111 outputs, to the recording medium 203, the following image(s) which has been generated by the compressor 110 and to which the metadata has been appended: the compressed RAW image, and the JPEG image when the developing processing has been executed. In step S309, the recording medium 203 stores the compressed RAW image and the JPEG image which were output in step S308 and to which the metadata has been appended. The end of the process of step S309 marks the end of a sequence of processes until the generated image pickup signals are stored to the recording medium 203.

Although the RAW image is recorded also when the developing processing has been executed in the foregoing example, the RAW image may not be recorded when the developing processing has been executed.

Figure 4:
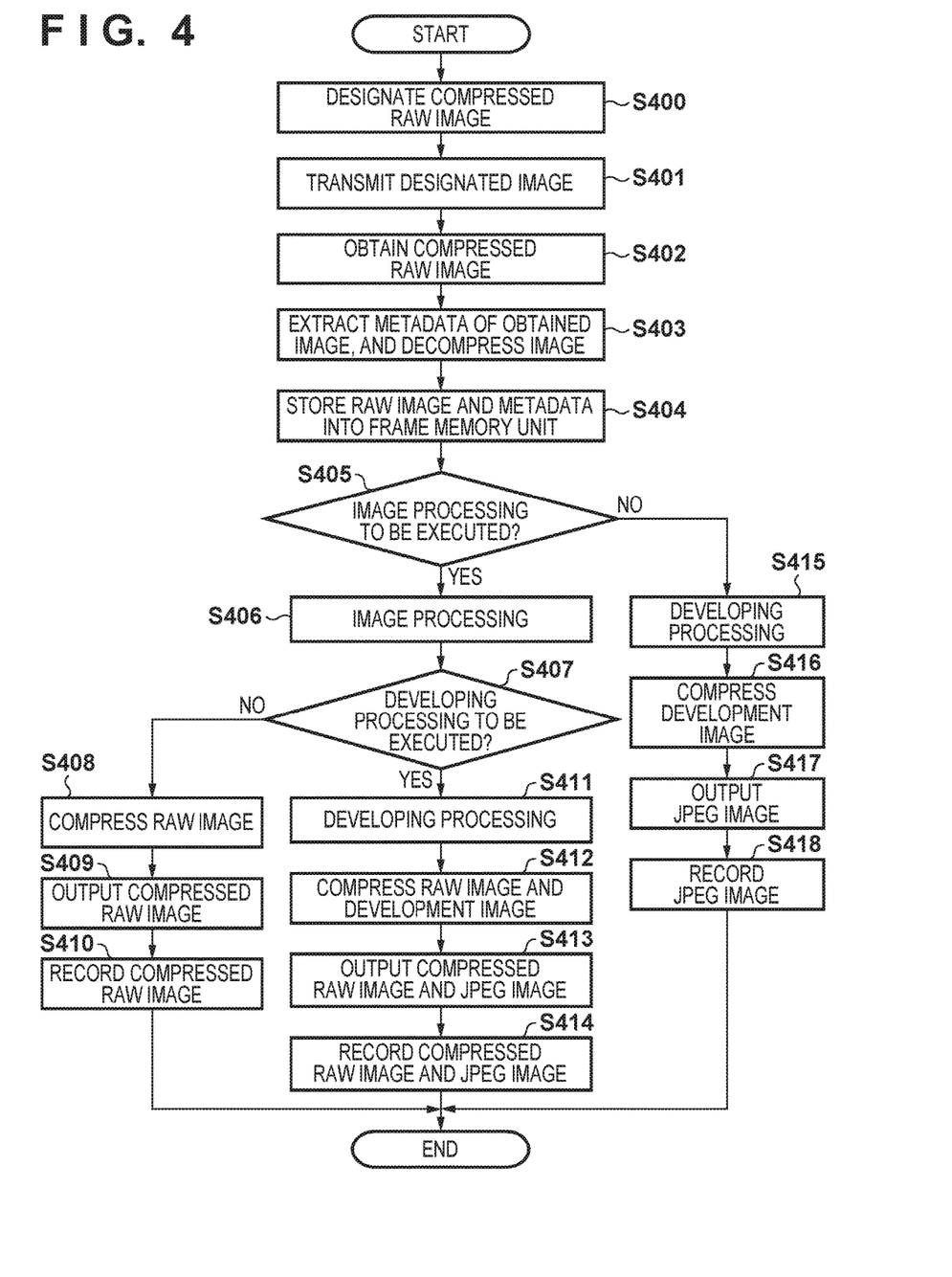
FIG. 4 is a flowchart for describing the flow of reproduction image processing according to the first embodiment.

With reference to FIG. 4, the following describes a case in which image processing and developing processing are applied to a compressed RAW image stored in the recording medium 203. FIG. 4 is a flowchart showing the flow of reproduction image processing in which the image processing and the developing processing are applied to an image stored in the recording medium 203 using the decompressor 107, the image processor 109, and the developing processor 113 that are included in the image sensor 100.

In step S400, an image to which the image processing and the developing processing are to be applied is designated by an instruction issued by the user via the console unit 204 from among compressed RAW images stored in the recording medium 203. In step S401, the recording medium 203 transmits the image designated in step S400 to the input unit 106 of the image sensor 100.

In step S402, the input unit 106 obtains the compressed RAW image supplied in step S401, and supplies it to the decompressor 107. In step S403, the decompressor 107 extracts metadata by analyzing a data structure of the compressed RAW image supplied in step S402, and generates a RAW image by decompressing the compressed RAW image. The decompressor 107 then supplies the generated RAW image and the extracted metadata to the frame memory unit 112 via parallel communication. In step S404, the frame memory unit 112 stores the RAW image and the metadata that were respectively generated and extracted in step S403, and supplies the stored RAW image and metadata to the image processor 109.

In step S405, whether to apply the image processing to the RAW image supplied in step S404 is designated on the basis of an instruction issued by the user via the console unit 204. If the application of the image processing is designated, step S406 follows.

In step S406, the image processor 109 executes the image processing designated by the user via the console unit 204, using the RAW image and the extracted metadata supplied in step S404. Examples of the image processing executed here include defective pixel correction and noise reduction. For example, defective pixel correction and the like may be applied to pixels designated by the user. As described above, the image processing can be additionally applied to a RAW image that was stored to the recording medium after the image processing was applied thereto; in this way, a high-quality RAW image can be obtained.

In step S407, whether to apply the developing processing to the RAW image obtained through the image processing executed in step S406 is determined in accordance with an instruction issued by the user via the console unit 204. If it is determined that the developing processing is not to be applied, step S408 follows in which the image processor 109 supplies the RAW image obtained through the image processing and the metadata to the compressor 110. The compressor 110 then generates a compressed RAW image by applying lossless compression to the supplied RAW image, appends the metadata thereto, and supplies the generated compressed RAW image to the output unit 111. Next, in step S409, the output unit 111 supplies the compressed RAW image supplied in step S408 to the recording medium 203. In step S410, the recording medium 203 stores the compressed RAW image supplied in step S409. The end of the process of step S410 marks the end of a sequence of processes.

On the other hand, if it is determined in step S407 that the developing processing is to be applied, step S411 follows in which the image processor 109 supplies the RAW image obtained through the image processing and the metadata to the compressor 110 and the developing processor 113. Furthermore, in step S411, the developing processor 113 generates a development image by executing the developing processing designated by the user via the console unit 204 using the supplied RAW image and metadata, and supplies the generated development image and the metadata to the compressor 110.

In step S412, the compressor 110 generates a compressed RAW image and a JPEG image by applying compression processing to the RAW image and the development image supplied in step S411, appends the metadata thereto, and supplies the generated compressed RAW image and JPEG image to the output unit 111.

In step S413, the output unit 111 supplies the compressed RAW image and the JPEG image supplied in step S412 to the recording medium 203. In step S414, the recording medium 203 stores the compressed RAW image and the JPEG image supplied in step S413. The end of the process of step S414 marks the end of the sequence of processes.

If the application of the image processing is not designated in step S405, the image processor 109 supplies, to the developing processor 113, the RAW image and the metadata supplied in step S404 as-is without applying the image processing to the RAW image, and then step S415 follows. In step S415, the developing processor 113 generates a development image by applying the developing processing designated by the user via the console unit 204 using the RAW image and the metadata supplied in step S405. The developing processor 113 also supplies the development image obtained through the developing processing and the metadata to the compressor 110.

In step S416, the compressor 110 generates a JPEG image by applying the compression processing to the development image supplied in step S415, and appends the metadata thereto. The compressor 110 also supplies the generated JPEG image to the output unit 111.

In step S417, the output unit 111 supplies the JPEG image supplied in step S416 to the recording medium 203. In step S418, the recording medium 203 stores the JPEG image supplied in step S417. The end of the process of step S418 marks the end of the sequence of processes.

In the first embodiment, the image stored in the aforementioned step S309 need not be designated because a compressed RAW image stored in the recording medium 203 can be designated in step S400. Although the compression method used in generating compressed RAW images varies with each manufacturer that sells image capturing apparatuses, the decompressor 107 can analyze the compression method and decompresses the compressed RAW images if the compressed RAW images have been compressed using well-known techniques. Therefore, a compressed RAW image that has been generated by another image capturing apparatus can be processed. In this case, in step S403, the decompressor 107 generates a RAW image by executing decompression processing corresponding to the compression method used for the compressed RAW image.

As described above, according to the present first embodiment, the input unit and the decompressor are included in the image sensor having a stacked structure, thereby making it possible to apply developing processing to a compressed RAW image that has been output from the image sensor and recorded in the recording medium using the developing processor. Furthermore, as the decompressor is included in the image sensor, a compressed image can be input to the image sensor; this can reduce an amount of data communication between the recording medium and the image sensor. Moreover, as a decompressed RAW image is transmitted via parallel communication, a period of data communication can be reduced.

Second Embodiment

A second embodiment of the present invention will now be described. The above-described first embodiment pertains to an example in which a compressed RAW image stored in the recording medium 203 is input to the image sensor 100, and image processing and developing processing are applied to the input compressed RAW image. In contrast, in the second embodiment, composition processing is executed in which addition, subtraction, and the like are performed between image pickup data from an image sensor 500 and a compressed RAW image stored in the recording medium 203. Execution of adding or averaging processing enables two images to be composited together. Furthermore, fixed-pattern noise, such as noise associated with darkness, can be removed by obtaining and storing a black image satisfying a preset condition in the recording medium 203 in advance, and executing subtraction processing at the time of shooting with the use of the black image. The following describes an example in which subtraction processing is applied to data obtained through image shooting with the use of a black image stored in the recording medium 203.

Figure 5:
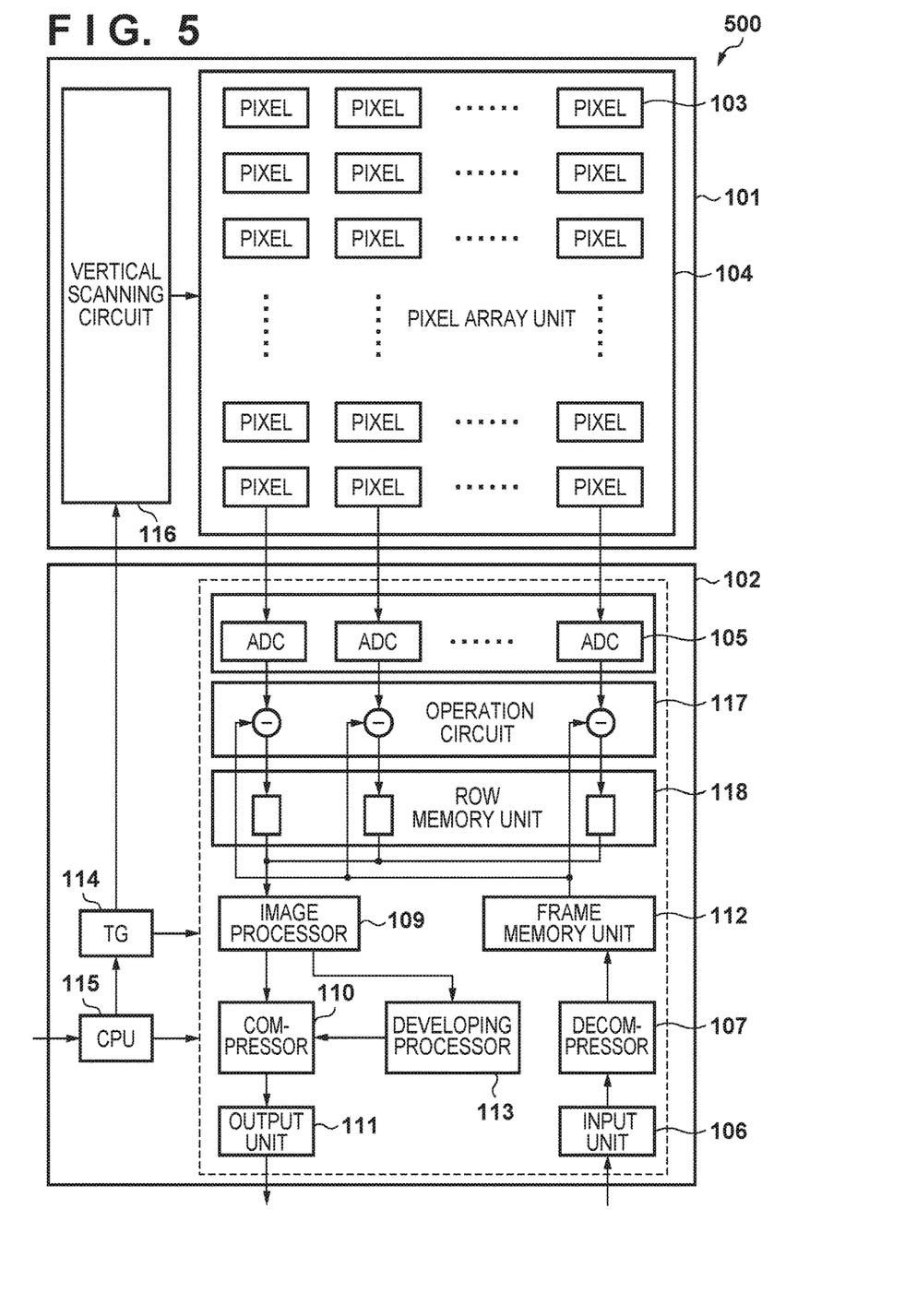
FIG. 5 is a block diagram showing an exemplary configuration of an image sensor according to a second embodiment.

FIG. 5 is a block diagram showing an exemplary configuration of the image sensor 500 according to the second embodiment. The image sensor 500 shown in FIG. 5 is realized by adding an operation circuit 117 to the image sensor 100 shown in FIG. 1. As other constituents are similar to the constituents shown in FIG. 1, they are given the same reference numerals thereas, and a description thereof will be omitted.

The frame memory unit 112 supplies a RAW image (image signals) supplied from the decompressor 107 to the operation circuit 117. The operation circuit 117 executes operation processing, such as addition and subtraction, using image pickup data supplied from the ADCs 105 on a per-row basis and RAW image data supplied from the frame memory unit 112 on a per-row basis. Note that the frame memory unit 112 supplies data to the operation circuit 117 in such a manner that data sets each corresponding to a different one of rows are supplied in parallel. The operation circuit 117 supplies the result of the operation processing to the row memory unit 118. The row memory unit 118 stores the operation result supplied from the operation circuit 117. The row memory unit 118 also supplies the stored data to the image processor 109.

Unlike the image sensor 100 shown in FIG. 1, the image sensor 500 shown in FIG. 5 is configured in such a manner that the frame memory unit 112 does not supply the RAW image and metadata to the image processor 109; alternatively, the RAW image and metadata may be supplied.

Figure 6:
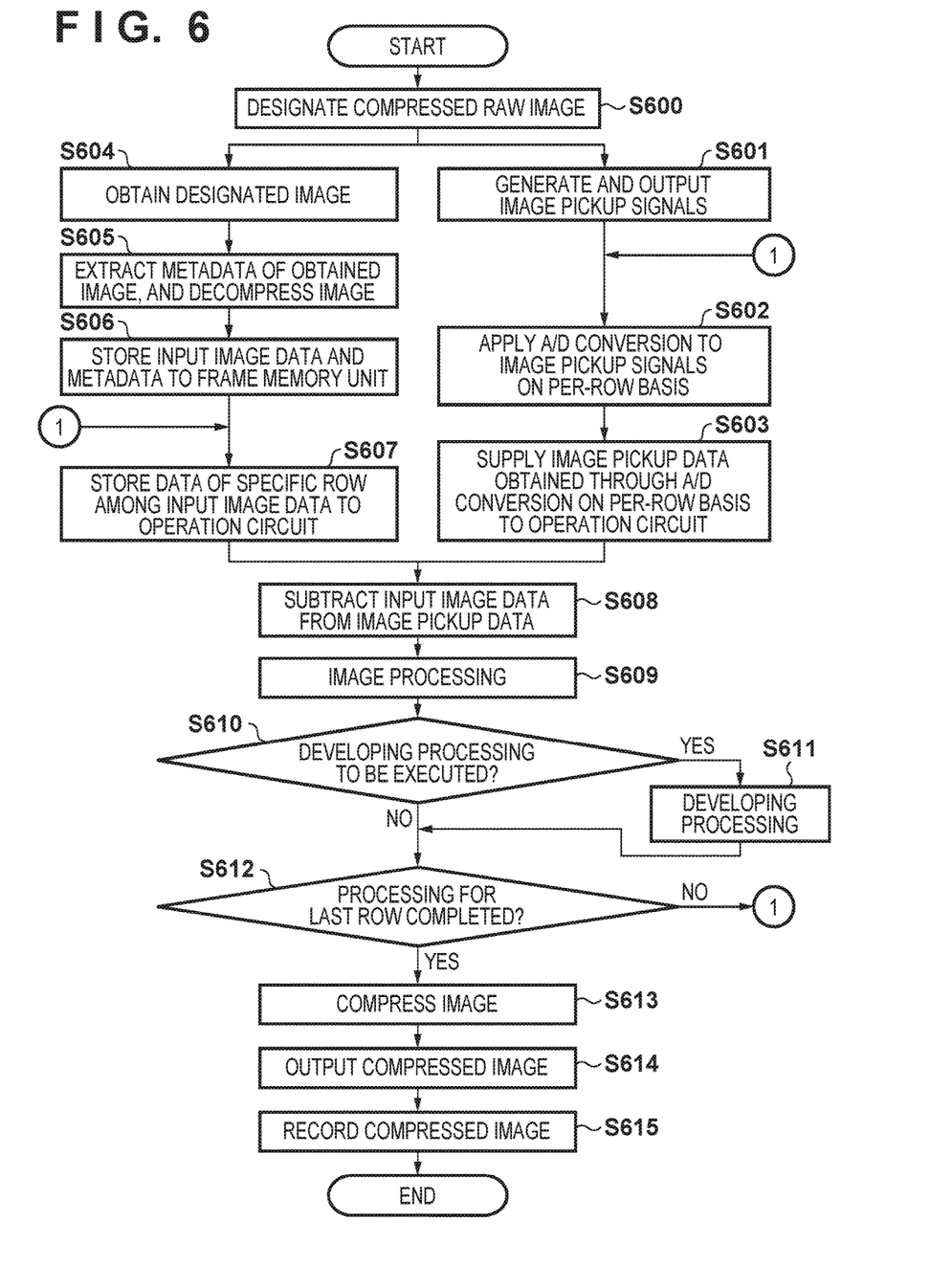
FIG. 6 is a flowchart for describing the flow of image capturing processing and image processing according to the second embodiment.

FIG. 6 is a flowchart of processing executed by the image capturing apparatus 200 incorporating the image sensor 500 shown in FIG. 5 according to the second embodiment. In step S600, the console unit 204 designates, from among compressed RAW images stored in the recording medium 203, an image that has been selected by an instruction from a user to be used in subtraction. Upon completion of step S600, steps S601 and S604 follow. Note that the processes from step S601 are executed in parallel with the processes from step S604.

In step S601, the image sensor 500 starts image capturing processing, the pixels 103 of the image sensor 500 generate image pickup signals by photoelectrically converting light with which they have been illuminated, and the image pickup signals are sequentially output from the pixel array unit 104 on a per-row basis. Next, in step S602, the ADCs 105 convert the image pickup signals, which have been sequentially output on a per-row basis, into digital image pickup data on a per-row basis. In step S603, the ADCs 105 supply the image pickup data obtained through the conversion in step S602 to the operation circuit 117.

Meanwhile, in step S604, the recording medium 203 transmits the compressed RAW image designated in step S600 to the input unit 106 of the image sensor 500, and the input unit 106 obtains the supplied compressed RAW image and supplies it to the decompressor 107.

In step S605, the decompressor 107 extracts metadata by analyzing a data structure of the decompressed RAW image supplied in step S604, and generates a RAW image (hereinafter, "input image data") by decompressing the compressed RAW image. The decompressor 107 then supplies the generated input image data and the extracted metadata to the frame memory unit 112 via parallel communication. In step S606, the frame memory unit 112 stores the input image data and the metadata supplied in step S605.

In step S607, the frame memory unit 112 supplies, among the input image data stored in step S606, data of a row corresponding to the per-row image pickup data obtained through the conversion in step S602 to the operation circuit 117. Note that the frame memory unit 112 supplies data to the operation circuit 117 in such a manner that data sets each corresponding to a different one of rows are supplied in parallel, and control is performed so that supply of the input image data is completed by the time when image pickup data corresponding to one row is input to the operation circuit 117 in step S603.

In step S608, the operation circuit 117 subtracts the input image data supplied in step S607 from the image pickup data supplied in step S603, and supplies the post-subtraction image pickup data to the row memory unit 118. In step S609, the image processor 109 applies image processing to the image pickup data supplied in step S608, and supplies a RAW image obtained through the image processing to the compressor 110.

In the next step S610, whether to execute developing processing is determined, and if it is determined that the developing processing is not to be executed, step S612 follows. On the other hand, if it is determined that the developing processing is to be executed, the developing processor 113 applies the developing processing to the RAW image obtained through the image processing and supplies a development image obtained through the developing processing to the compressor 110 in step S611, and then step S612 follows.

In step S612, the CPU 115 checks whether processing for image signals output from the last row of the pixel array unit 104 has been completed. If the processing for the image signals output from the last row of the pixel array unit 104 has not been completed, steps S602 and S607 follow, and the foregoing processing is repeated for the next row. At this time, the process of step S607 is executed in parallel with the processes of steps S602 and S603 because the frame memory unit 112 supplies, among the input image data, data of a specific row corresponding to the per-row image pickup data obtained through the conversion by the ADCs 105 in step S602 to the operation circuit 117.

On the other hand, if the processing for the image signals output from the last row has been completed, step S613 follows in which the compressor 110 generates a compressed RAW image by applying lossless compression to the RAW image supplied in step S609, and appends the metadata thereto. When the developing processing has been executed, the compressor 110 also generates a JPEG image by compressing the development image supplied in step S611 using a JPEG encoding method, and appends the metadata thereto.

In step S614, the output unit 111 outputs, to the recording medium 203, the following image(s) which has been generated by the compressor 110 and to which the metadata has been appended: the compressed RAW image, and the JPEG image when the developing processing has been executed. In step S615, the recording medium 203 stores the compressed RAW image and the JPEG image which were output in step S614 and to which the metadata has been appended. The end of the process of step S615 marks the end of a sequence of processes.

In step S608 of the above-described processing according to the present second embodiment, the input image data supplied in step S607 is subtracted from the image pickup data supplied in step S603. Alternatively, depending on the content of the image processing, the subtraction processing may be replaced with, for example, addition processing, and the operation circuit 117 may be replaced with an addition circuit.

Although the RAW image is recorded also when the developing processing has been executed in the foregoing example, it may be that the RAW image is not be recorded when the developing processing has been executed.

Although the operation processing for the image pickup data and the input image data is sequentially executed in accordance with readout of the image pickup data in the above-described second embodiment, the image processor 109 may execute the operation after readout of one frame has been completed. In this case, the operation is enabled by supplying the input image data stored in the frame memory unit 112 to the image processor 109 as in the configuration shown in FIG. 1.

A description is now given of an exemplary use that exploits the foregoing processing according to the second embodiment. Data (a black image) that is obtained from the image sensor while the image sensor is shielded from light includes noise that appears between the generation of image pickup signals and analog/digital conversion. That is to say, this noise is added to image pickup data as an offset. In view of this, noise can be reduced by storing a compressed RAW image of the black image to the recording medium in advance, and subtracting the black image from image pickup data that is obtained while the image sensor is not shielded from light. As a result, a high-quality RAW image can be obtained from the image sensor.

Furthermore, in the foregoing exemplary use, the black image can be selected using metadata. In this case, for example, the user selects a plurality of compressed RAW images in step S600, and the processes of steps S604 and S605 are applied to the plurality of selected images in a manner similar to the above-described manner. Then, the following processing is executed before step S608.

In this case, although not shown in FIG. 5, the frame memory unit 112 supplies pieces of metadata to the image processor 109, and the result of image selection in the image processor 109 is returned to the frame memory unit 112. The frame memory unit 112 supplies a plurality of pieces of metadata stored in step S606 to the image processor 109. The image processor 109 compares pieces of temperature information of the image sensor that are included in the plurality of pieces of metadata supplied from the frame memory unit 112 with temperature information in the image sensor 500. On the basis of the result of comparison, the image processor 109 determines input image data corresponding to metadata including temperature information closest to the temperature of the image sensor 500 as data to be used as a black image. The image processor 109 also transmits the result of determination to the frame memory unit 112. The frame memory unit 112 supplies the input image data based on the received result of determination in step S607. Even if an amount of noise changes with a change in the temperature of the image sensor 500, the foregoing processing enables noise reduction in accordance with the change in the amount of noise. As a result, a high-quality RAW image can be obtained from the image sensor 500.

As the process of step S608 eliminates the need to apply dark shading correction and defect correction to the post-subtraction image pickup data, the image processor 109 may apply image processing, such as color shading correction, to the post-subtraction image pickup data in step S609.

As described above, according to the present second embodiment, a new RAW image can be generated by subtracting an image stored in the recording medium from image pickup data output from the image sensor. Furthermore, as the decompressor is included in the image sensor, a compressed image can be input to the image sensor; this can reduce an amount of data communication between the recording medium and the image sensor. Moreover, as a decompressed RAW image is transmitted via parallel communication, a period of data communication can be reduced.

Third Embodiment

Figure 7A:
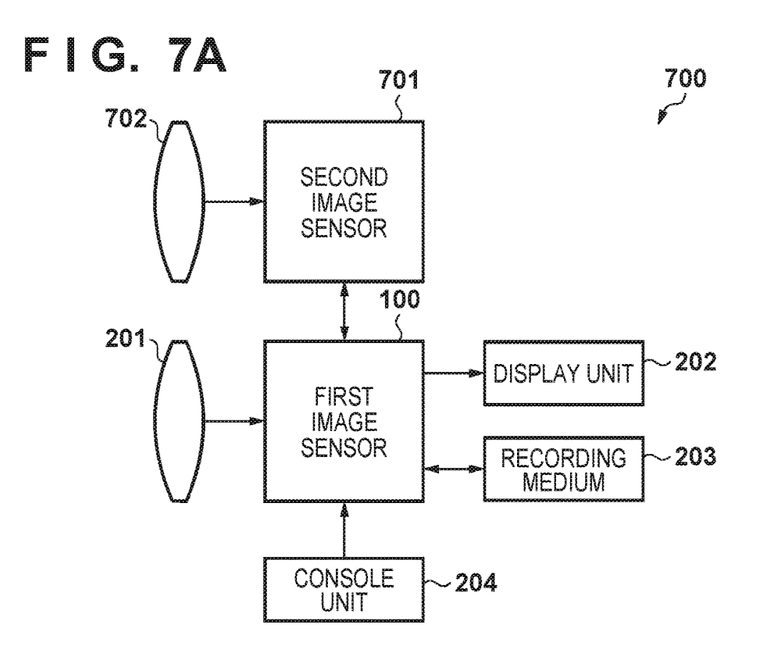
FIGS. 7A and 7B are block diagrams showing exemplary configurations of an image capturing apparatus according to a third embodiment.
Figure 7B:
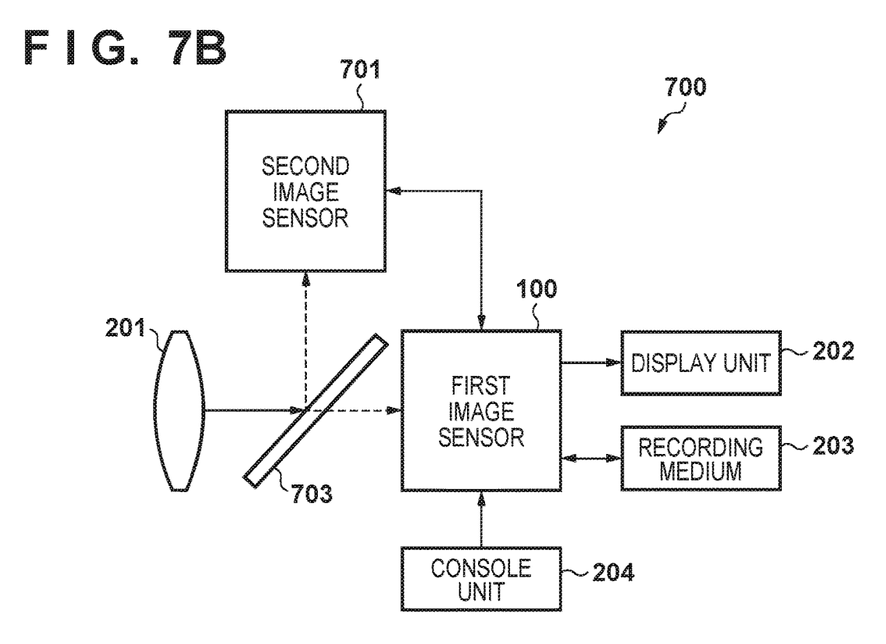

A third embodiment of the present invention will now be described. FIGS. 7A and 7B are block diagrams showing exemplary configurations of an image capturing apparatus 700 incorporating image sensors according to the third embodiment.

FIG. 7A shows a configuration in which the image capturing apparatus shown in FIG. 2 further includes a second image sensor 701 provided with a compressor, and a lens 702. As other constituents are similar to the constituents shown in FIG. 2, a description thereof will be omitted; the image sensor 100 will be referred to as the first image sensor 100 in the third embodiment for distinction from the second image sensor 701.

The lens 702 forms an optical image of a subject on the second image sensor 701. That is to say, in the configuration shown in FIG. 7A, one image sensor is allocated to one lens, and thus different optical images of the subject are formed on different image sensors.

FIG. 7B shows a configuration in which the image capturing apparatus shown in FIG. 2 further includes the second image sensor 701 provided with the compressor, and a mirror 703. The mirror 703 is semi-transmissive, and forms an optical image of a subject incident via the lens 201 on the first image sensor 100 and the second image sensor 701. That is to say, in FIG. 7B, the optical image of the subject obtained via the same lens can be formed on two image sensors.

Figure 8:
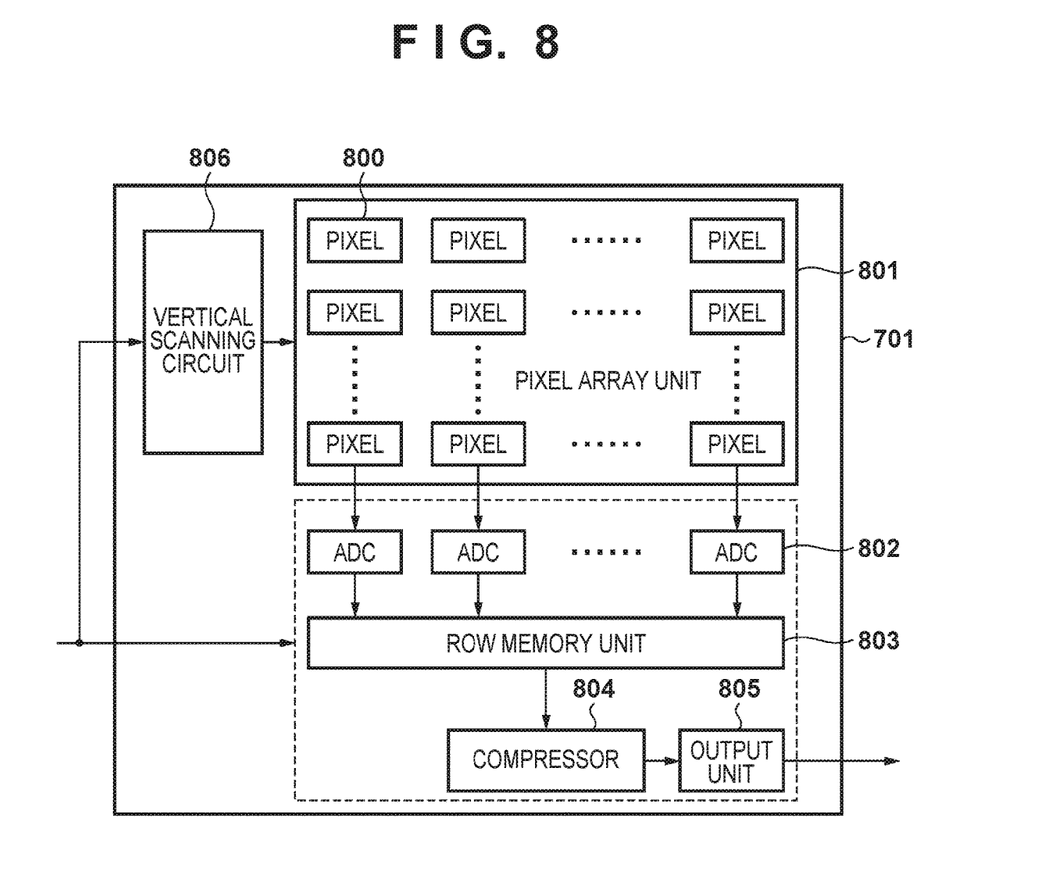
FIG. 8 is a block diagram showing an exemplary configuration of a second image sensor according to the third embodiment.

FIG. 8 shows an exemplary configuration of the second image sensor 701. The second image sensor 701 includes a pixel array unit 801 composed of pixels 800, ADCs 802, a row memory unit 803, a compressor 804, an output unit 805, and a vertical scanning circuit 806.

In the pixel array unit 801, the plurality of pixels 800 including photoelectric converters that convert light into electricity are arrayed two-dimensionally in row and column directions. The pixels 800 generate and accumulate signal charges corresponding to light with which they have been illuminated. The pixels 800 then supply the signal charges as image pickup signals to the ADCs 802.

The ADCs 802 are disposed in one-to-one correspondence with pixel columns of the pixel array unit 801, and convert image pickup signals that are sequentially output from the pixel array unit 801 on a per-row basis into image pickup data by applying analog/digital conversion processing to the image pickup signals on a per-row basis. The ADCs 802 supply the image pickup data obtained through the conversion to the row memory unit 803, and the row memory unit 803 stores the per-row image pickup data supplied from the ADCs 802. The row memory unit 803 also supplies the stored data to the compressor 804.

The compressor 804 has a function of performing lossless compression and lossy compression. With the use of these circuits, the compressor 804 applies compression processing to the image pickup data supplied from the row memory unit 803, and supplies the compressed image pickup data to the output unit 805.

The output unit 805 includes a terminal via which the compressed image pickup data (compressed image signals) supplied from the compressor 804 is supplied to the input unit of the first image sensor 100. The output unit 805 supplies the compressed data to the input unit of the first image sensor 100 using this terminal. The vertical scanning circuit 806 controls accumulation and readout of signal charges of the pixels 800 on the basis of the control signal supplied from the TG 114 of the first image sensor 100. As described above, the circuits and processors composing the second image sensor 701 are driven and controlled by control signals supplied from the TG 114 and the CPU 115 of the first image sensor 100.

The image capturing apparatus 700 can apply image processing to data output from the second image sensor 701 in processing flows similar to the processing flows according to the first embodiment. Furthermore, the image capturing apparatus 700 is configured in such a manner that one image processor 109 can apply image processing to each of data output from the image sensor 100 and data output from the image sensor 701 in accordance with these pieces of data.

Figure 9:
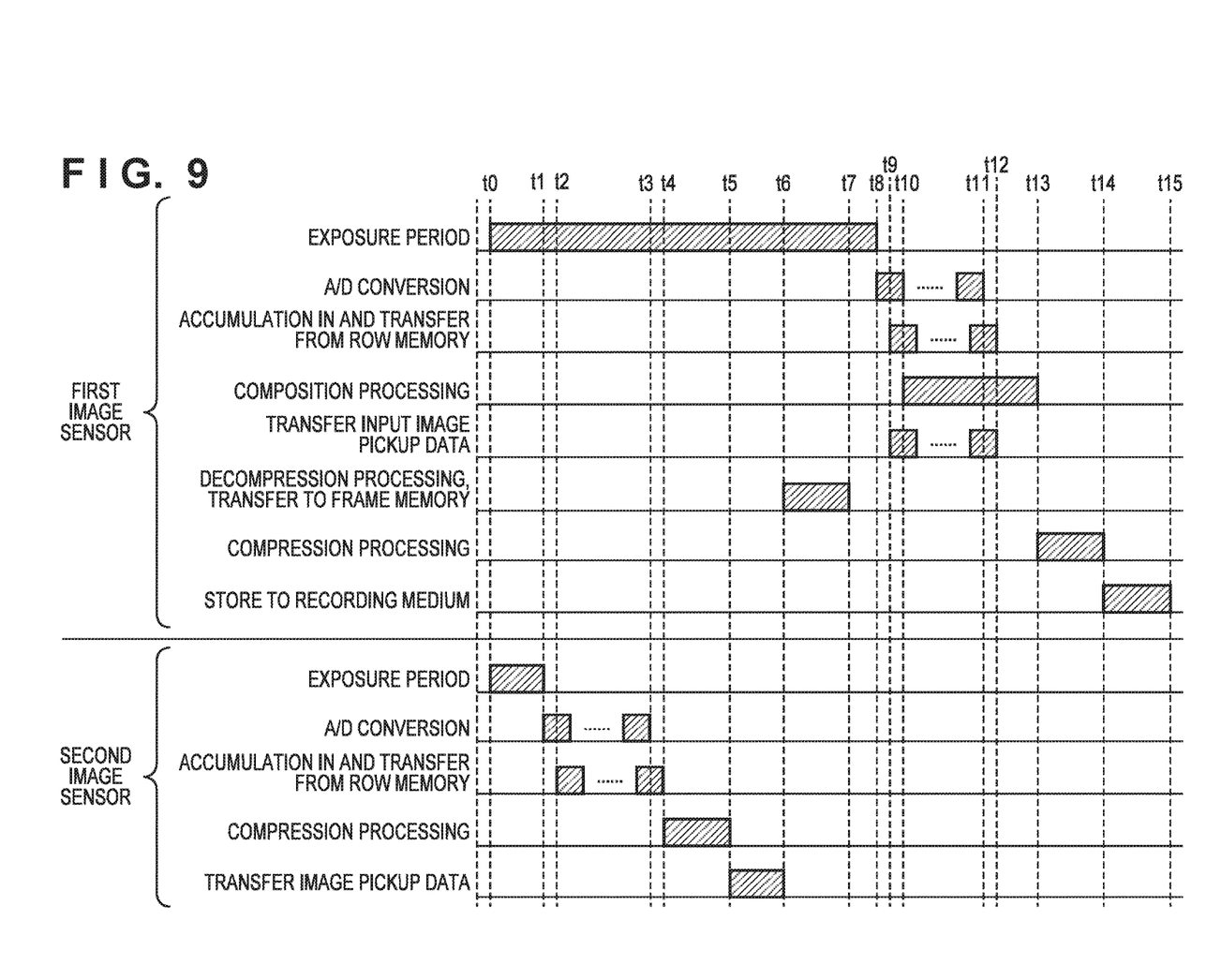
FIG. 9 is a timing chart showing the flow of processing according to the third embodiment.

A description is now given of an example of composition processing that is executed by the image capturing apparatus 700 configured in the above-described manner using the first image sensor 100 and the second image sensor 701. FIG. 9 is a timing chart for describing the composition processing of the image capturing apparatus 700. It will be assumed that the following image shooting condition is set in FIG. 9: an exposure period of the first image sensor 100 is longer than an exposure period of the second image sensor 701.

At time t0, the first image sensor 100 and the second image sensor 701 start image capturing processing, illuminate the pixel array units 104 and 801 with light, and start accumulating charges.

At time t1, the second image sensor 701 ends the exposure, generates image pickup signals from the accumulated charges, and outputs the generated image pickup signals from the pixel array unit 801 on a per-row basis. Furthermore, the ADCs 802 start processing for converting the image pickup signals that have been sequentially output on a per-row basis into image pickup data. The ADCs 802 then sequentially supply the per-row image pickup data obtained through the conversion to the row memory unit 803.

At time t2, the row memory unit 803 sequentially stores the image pickup data supplied from the ADCs 802, and sequentially supplies the stored image pickup data to the compressor 804. At this time, the row memory unit 803 stores the supplied image pickup data of the first row of the pixel array unit 801 in parallel with the following events in the ADCs 802: the completion of conversion of the image pickup signals of the first row, and the start of conversion for the second row. These actions are repeatedly performed.

At time t3, the ADCs 802 convert the image pickup signals of the last row of the pixel array unit 801 into the image pickup data, and supply the image pickup data to the row memory unit 803. This marks the end of the analog/digital conversion processing by the ADCs 802.

At time t4, the row memory unit 803 stores the image pickup data of the last row of the pixel array unit 801, and supplies it to the compressor 804. This marks the end of storage and supply of the image pickup data by the row memory unit 803. On the other hand, the compressor 804 starts compressing the supplied image pickup data. Depending on the compression method, the compression may be started before reception of image pickup data corresponding to one frame.

At time t5, the compressor 804 ends the compression processing, and supplies the compressed image pickup data to the output unit 805. Furthermore, the output unit 805 supplies the supplied compressed image pickup data to the input unit 106 of the first image sensor 100.

At time t6, the input unit 106 obtains the supplied compressed image pickup data, and supplies it to the decompressor 107. The decompressor 107 generates image pickup data (hereinafter, "input image pickup data") by starting decompression of the compressed image pickup data, and transfers the generated input image pickup data to the frame memory unit 112. The frame memory unit 112 starts storing the input image pickup data supplied from the decompressor 107.

At time t7, the decompressor 107 completes the generation and transfer of the input image pickup data, thereby ending the decompression processing. Furthermore, the frame memory unit 112 completes the storage of the input image pickup data.

At time t8, the first image sensor 100 ends the exposure, generates image pickup signals from the accumulated charges, and outputs the generated image pickup signals from the pixel array unit 104 on a per-row basis. Furthermore, the ADCs 105 start processing for converting the image pickup signals that have been sequentially output on a per-row basis into image pickup data. The ADCs 105 then sequentially supply the per-row image pickup data obtained through the conversion to the row memory unit 108.

At time t9, the row memory unit 108 sequentially stores the image pickup data supplied from the ADCs 105, and sequentially supplies the stored image pickup data to the image processor 109. At this time, the row memory unit 108 stores the supplied image pickup data of the first row of the pixel array unit 104 in parallel with the following events in the ADCs 105: the completion of conversion of the image pickup signals of the first row, and the start of conversion for the second row. These actions are repeatedly performed. The frame memory unit 112 starts processing for supplying the stored input image pickup data to the image processor 109.

At time t10, the image processor 109 starts composition processing using the supplied input image pickup data and image pickup data. At time t11, the ADCs 105 convert the image pickup signals of the last row of the pixel array unit 104 into the image pickup data, and supplies the image pickup data to the row memory unit 108. This marks the end of the analog/digital conversion processing by the ADCs 105.

At time t12, the row memory unit 108 stores the image pickup data of the last row of the pixel array unit 104, and supplies it to the image processor 109. This marks the end of storage and supply of the image pickup data by the row memory unit 108. Also, the frame memory unit 112 completes supply of the input image pickup data.

At time t13, upon completion of the composition processing, the image processor 109 supplies a RAW image obtained through the composition processing to the compressor 110. The compressor 110 starts processing for applying lossless compression to the supplied RAW image and appending metadata thereto. Note that image processing, such as shading correction and defect correction, may be applied to the RAW image that has undergone the composition processing.

At time t14, the compressor 110 ends the compression processing, and supplies the generated compressed RAW image to the output unit 111. The output unit 111 supplies the supplied compressed RAW image to the recording medium 203. The recording medium 203 then starts storing the supplied compressed RAW image.

At time t15, the recording medium 203 completes the storage of the compressed RAW image, thereby ending the storage processing. The end of this process marks the end of a sequence of processes.

Note that the developing processor 113 may apply developing processing to the RAW image obtained through the composition processing, and the compressor 110 may compress the resultant development image and store the compressed development image to the recording medium 203.

As described above, the image capturing apparatus according to the third embodiment includes two image sensors, and can obtain a composite image by compositing pieces of image pickup data from the two image sensors. In the third embodiment, as has been described, one image sensor performs image shooting with long-time accumulation, whereas the other image sensor performs image shooting with short-time accumulation; in this way, for example, an astronomical photograph that requires long-time image shooting and a portrait photograph for which short-time image shooting is preferable can be composited together. Although the first image sensor 100 and the second image sensor 701 start image shooting simultaneously in FIG. 9, they may start image shooting at different timings. Furthermore, the exposure period of the first image sensor 100 and the exposure period of the second image sensor 701 may be the same. In addition, not only the accumulation period but also other image shooting conditions, such as the ISO film speed, may vary between the first image sensor 100 and the second image sensor 701.

A description is now given of a specific application of the composition processing executed in the third embodiment. In FIG. 7A, the following composition processing can be executed on the basis of the positional relationship between the image sensors and pieces of image pickup data obtained from the image sensors: composition processing for generating an image with depth information appended thereto, and composition processing for generating a panoramic image by joining the pieces of image pickup data. In FIG. 7B, different ISO film speeds and different accumulation periods can be set in different image sensors for the same subject, and composition processing for generating a RAW image with fine gradation can be executed using obtained images. It goes without saying that image processing designated by a user via the console unit may be executed in place of the foregoing composition processing.

Although the composition processing is executed using pieces of image pickup data generated by the image sensors in the third embodiment, a compressed RAW image recorded in the recording medium 203 may be added in this composition processing. Note that it is not essential to use pieces of image pickup data obtained from the two image sensors, and image processing may be executed using image pickup data of the second image sensor 701 and a compressed RAW image recorded in the recording medium 203.

Furthermore, instead of applying the composition processing to image pickup data obtained by the first image sensor 100 and image pickup data obtained by the second image sensor 701, image processing may be applied to these pieces of image pickup data independently, and the resultant pieces of image pickup data may be output after applying compression processing thereto.

At time t13, processing for generating a compressed RAW image by applying lossless compression to a RAW image is started; alternatively, a JPEG image may be generated by generating a development image and compressing the development image using a JPEG encoding method as in the second embodiment.

As described above, according to the third embodiment, a new RAW image can be generated with the use of compressed image pickup data output from the second image sensor 701 and image pickup data generated by the first image sensor 100. Furthermore, as the decompressor 107 is included in the first image sensor 100, a compressed image with a small data size can be input to the first image sensor 100; this can reduce an amount of data communication between the first image sensor 100 and the second image sensor 701. Moreover, as image pickup data to which decompression processing has been applied is transmitted in parallel, a communication period can be reduced.

As described above, in the first to third embodiments, image data is input from the outside of an image sensor at high speed, and processed inside the image sensor.

Although the preferred embodiments of the present invention have been described thus far, the present invention is not limited to these embodiments, and various modifications and changes can be made within the scope of the principles of the present invention. For example, processing of the present invention can be used in a case in which decompression processing is applied to an image that is compressed using a lossy compression method after the image is input to the image sensor 100, although the image will lose information through the compression.

Although the ADCs of the image sensor 100 are disposed on the signal processor substrate 102 according to the above description, they may be disposed on the image sensor substrate 101. Although the ADCs are disposed in one-to-one correspondence with the pixel columns of the pixel array unit according to the above description, the ADCs may be disposed in one-to-one correspondence with the pixels on the signal processor substrate 102 or another substrate.

Processing executed by a certain processor may be executed by another processor. Specifically, although metadata appended to a compressed RAW image is analyzed and extracted by the decompressor according to the above description, this processing may be executed by the image processor.

Although the input unit and the decompressor are disposed on the same substrate as the image processor in FIG. 1, they need not be disposed on the same substrate. For example, although the image sensor 100 is composed of two substrates in the first embodiment, it may be composed of three or more substrates. In this case, for example, the pixel array unit and vertical scanning circuit are disposed on the first substrate, the image processor, developing processor, and memory unit are disposed on the second substrate, and the input unit, output unit, decompressor, compressor, TG, and CPU are disposed on the third substrate.

Although the image sensor 100 is structured in such a manner that the image sensor substrate 101 and the signal processor substrate 102 are stacked together according to the above description, it may be that it does not have the stacked structure, and it may be structured in such a manner that the functions of these substrates are aggregated on one substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230025, filed on Nov. 25, 2015 which is hereby incorporated by reference herein in its entirety.

What is claimed is:

1. An image sensor comprising:
   an imaging unit including a plurality of photoelectric converters;
   an input unit, including a terminal, to which compressed image data is input from outside of the image sensor;
   an image processor that applies image processing to image pickup data obtained from the imaging unit; and
   a decompressor for extracting metadata attached to the compressed image data by analyzing a data structure of the compressed image data, decompressing the compressed image data input from the input unit, and supplying the decompressed image data and the extracted metadata to the image processor,
   wherein the image processor applies the image processing to the decompressed image data using the metadata.

2. The image sensor according to claim 1, further comprising:
   a compressor for compressing the image data to which the image processing has been applied by the image processor; and
   an output unit, including a terminal, for outputting, to the outside, the image data that has been compressed by the compressor.

3. The image sensor according to claim 1, wherein the imaging unit and the image processor are configured on different substrates that are stacked together, and are electrically connected to each other.

4. The image sensor according to claim 1, further comprising an operation unit that includes circuitry and that composites together the image pickup data obtained from the imaging unit and the decompressed image data,
   wherein the image processor applies the image processing to the image pickup data obtained from the imaging unit and the decompressed image data by applying the image processing to data obtained through the composition performed by the operation unit.

5. The image sensor according to claim 1, wherein the image processor composites together the image pickup data obtained from the imaging unit and the decompressed image data, and applies the image processing to the image pickup data obtained from the imaging unit and the decompressed image data by applying the image processing to data obtained through the composition.

6. An image capturing apparatus, comprising:
a first image sensor including:
    an imaging unit having a plurality of photoelectric converters,
    an input unit, including a terminal, to which compressed image data is input from outside of the first image sensor,
    an image processor that applies image processing to image pickup data obtained from the imaging unit, and
    a decompressor for extracting metadata attached to the compressed image data by analyzing a data structure of the compressed image data, decompressing the compressed image data input from the input unit, and supplying the decompressed image data and the extracted metadata to the image processor; and a second image sensor including:
    a plurality of second photoelectric converters,
    a compressor that compresses image data obtained from the plurality of second photoelectric converters, and
    an output unit, including a terminal, that outputs the image data compressed by the compressor,
wherein the image processor applies the image processing to the image data that has been input from the output unit to the input unit and decompressed by the decompressor using the metadata.

7. The image sensor according to claim 1, further comprising a frame memory that stores the decompressed image data and the extracted metadata,
wherein the frame memory is arranged between the decompressor and the image processor.

8. The image capturing apparatus according to claim 6, wherein the first image sensor further comprises a frame memory that stores the decompressed image data and the extracted metadata, and
wherein the frame memory is arranged between the decompressor and the image processor.

* * * * *